Dec. 23, 1969     C. LEHMANN     3,485,010
DEVICE FOR DRIVING PACKAGE-FORMING
JAWS OF A PACKING MACHINE
Filed Nov. 15, 1967     3 Sheets-Sheet 1

INVENTOR
CURT LEHMANN

INVENTOR
CURT LEHMANN

Dec. 23, 1969    C. LEHMANN    3,485,010
DEVICE FOR DRIVING PACKAGE-FORMING
JAWS OF A PACKING MACHINE
Filed Nov. 15, 1967    3 Sheets-Sheet 3

INVENTOR
CURT LEHMANN

United States Patent Office 3,485,010
Patented Dec. 23, 1969

3,485,010
DEVICE FOR DRIVING PACKAGE-FORMING JAWS OF A PACKING MACHINE
Curt Lehmann, Dresden, Germany, assignor to VEB Tabak- und Industriemaschinen Dresden, Dresden, Germany
Filed Nov. 15, 1967, Ser. No. 683,348
Int. Cl. B65b 51/30
U.S. Cl. 53—285   10 Claims

ABSTRACT OF THE DISCLOSURE

A package manufacturing machine in which a pair of jaws are required to approach each other for joining together opposed wall portions of an elongated tubular enclosure which moves continuously so that in accordance with the intervals between the movement of the jaws toward each other the tubular enclosure will have its wall portions joined to each other at given distances longitudinally of the tubular enclosure to form packages the length of which is determined by the distance between the longitudinally spaced joined portions of the opposed walls of the tubular enclosure. A pair of jaw carriers are respectively connected with these jaws to move them toward and away from each other, and a pair of rotary crank drive means are operatively connected with the jaw carriers to periodically move them toward and away from each other. The pair of rotary crank drive means are simultaneously driven by way of a pair of meshing gears which are identical with each other so that in response to rotary movement of one of these gears both of the rotary crank drive means are simultaneously rotated equally and oppositely. This one gear fixedly carries a slide block at a given distance from its axis of rotation, and a rotary crank slide which has an axis of rotation parallel to that of the axis of the gear which carries the slide block slidably, coacts with the latter slide block to transmit rotary movement to this one gear in response to rotation of the rotary crank slide about its axis. A rotating means is operatively connected with the rotary crank slide for rotating it about its axis at a uniform rate of speed, and an adjusting means coacts with the rotary crank slide for adjusting the distance between the axis of the latter and the axis of the above one gear. In accordance with this adjusted distance between these axes the uniform rotary movement of the rotary crank slide will be converted into a non-uniform rotary movement of the pair of rotary crank drive means, and the nature of the non-uniformity of the movements of the pair of rotary crank drive means will be determined by the adjusted distance between the pair of axes.

BACKGROUND OF THE INVENTION

Thus, the invention relates to package-manufacturing machines in which a pair of sealing or welding jaws are brought together so as to join to each other a pair of opposed wall portions of a continuously advancing tubular enclosure in which the goods which are to be packed are accommodated. These jaws repeatedly come together so as to join the opposed wall portions of the tubular enclosure to each other at given intervals which determine the lengths of the individual packages.

In particular, the invention relates to a structure for providing an adjustable drive for the jaws so as to regulate the lengths of the packages during the continuous manufacture thereof.

In the development of packing machines of this general type which are required to have a high output it is essential to have a continuously operating machine. One of the problems encountered in this connection, particularly with machines of the type where the goods are to be packed in relatively long packages, is the construction of the sealing or welding structure which seals or welds together the opposed wall portions of the tubular enclosure in such a way that it will fulfill the requirements presented by a continuously driven machine.

There are a number of known devices for manufacturing the transverse seal or weld which joins together the opposed wall portions of the tubular enclosure.

One of the known devices of this general type has a pair of rotary jaw carriers which carry the sealing or welding jaws and the rotary jaw carriers are adjustable one with espect to the other within relatively small limits, or they are interchangeable.

A construction of this type of course readily lends itself to the continuous operation of the machine and can easily be regulated in accordance with the driving requirements, but nevertheless this construction has certain dsadvantages which greatly limit the range of utility thereof. In general, a construction of this type can only be used for relatively short packages of small height. Where relatively long packages are required, it is essential to increase the size of the radii of rotary movement of the sealing or welding jaws with the result that a larger amount of packing material is used. The possibilities of adjustment, depending upon the height of the goods which are to be packaged, are extremely limited with this type of construction. As a result interchangeable parts of different formats are provided, such parts including the welding rails, the welding rail carriers, and change gears. Therefore, an extremely undesirable and inconvenient change from a construction conforming to one format to a construction conforming to another format is required, and it is also necessary to store the structures for the different formats. Moreover, with a construction of this type the period during which actual sealing or welding takes place is relatively short.

A further known construction of a device of this general type is designed in such a way that the welding or sealing jaws engage the sheet material whose wall portions are to be joined thereby and during engagement therewith simultaneously advance the tube with the goods enclosed therein. Thus, a construction of this type will indeed have the advantage of a sufficiently long period during which welding or sealing takes place and can also be adjusted to provide relatively long packages. However, this construction conflicts with and cannot be accommodated to a continuously operating drive, so that continuous operation of such machine is not possible.

There are, however, other known devices suitable for continuously operating packing machines of the above general type where a frame which guides the sealing jaws is swingable about a given turning point, with the arrangement being such that during a predetermined portion of the movement of the closed sealing jaws they carry out a movement in the same direction as and together with the path of movement of the packaging material. Thus, with this construction the drive for the sealing jaws and the swinging movement of the frame is controllable separately from and independently of the structure which feeds the packaging material. The closing movement of the sealing jaws is brought about by a pair of cams which participate in the swinging movements of the frame.

The disadvantage of this latter construction resides in the fact that the swinging movements of the frame require relatively large masses to be moved, and when the direction of movement is reversed impact stresses are encountered at the dead-center positions resulting in a rough operation of the machine with considerable noise and vibration, so that a smoothly operating machine cannot be achieved with this construction. Moreover, the cam drive for the closing movements of the jaws, when they approach each other, does not enable any high speed of rotation to be achieved. As a result of the separation of the drives special control devices are required to bring about the movement of the sealing structure at cycles which will be properly synchronized with the speed of movement of the packaging material.

Moreover, it is also known to move the pair of welding or sealing jaws by way of a pair of oppositely driven cranks while guiding the jaws for movement along straight paths in a slotted guide member. With a construction of this type the movement of the closed jaws during the sealing action simultaneously and together with the packing material is determined by the size of the radius of control cams. Also, with this construction the adjustment of the cyclical movements of the sealing jaws to be adapted to the particular lengths of the packages requires special adjusting members, and in one known machine of this type the controls are brought about by way of a scanning impulse of a photocell.

SUMMARY OF THE INVENTION

It is thus a primary object of the present invention to provide for a packing machine of the above general type a construction which will enable elongated tubular packages to be continuously manufactured, particularly with relatively great lengths for the packages, while providing for the movement of the jaws of the sealing or welding structure a drive which can be used at very high operating speeds.

Furthermore, it is an object of the invention to provide a construction of this type wherein the masses which are required to be moved are maintained within relatively small limits.

Also, it is an object of the present invention to provide a construction of this type which does not require an extensive time-consuming reconstruction in order to change from one format to another, and in fact it is an object of the invention to provide a structure which will avoid interchangeable components in order to bring about different formats.

In addition, it is an object of the present invention to provide a construction which will achieve the above objects while at the same time providing for the continuous operation a sufficiently long time for the sealing or welding to be carried out.

Thus, it is an object of the invention to provide a construction which will reliably synchronize the movement of the closed welding or sealing jaws together with the movement of the tubular enclosure for the material which is to be packaged, while at the same time being capable of synchronously adjusting the structure in a stepless manner in dependence upon the desired length of the individual packages and in dependence upon the speed of movement of the packing material, without, however, requiring any interchanging of any components so that the driving structure of the invention is permanently connected with the main drive of the machine of the invention.

With the structure of the invention the pair of transverse sealing or welding structures are driven along circular paths by a pair of rotary crank drive means which are driven equally and oppositely by the structure of the invention in a non-uniform manner to provide non-uniform movements of the sealing structures along their circular paths within predetermined limits depending upon the desired lengths of the packages while at the same time achieving for the sealing or welding structures a movement which is adjustable to the speed of movement of the packing material.

In order to achieve these non-uniform equal and opposite movements of the pair of rotary crank drive means, they are interconnected by a pair of identical meshing gears one of which carries a slide block at a predetermined distance from its axis of rotation, and it is this one gear which is driven to provide the equal and opposite rotation of the other gear so that the pair of crank drive means will be driven equally and oppositely. A rotary slide crank slidably engages the slide block and has an axis of rotation parallel to that of the gear which carries the slide block, and a rotating means of the invention rotates the rotary slide crank of the invention at a uniform speed of rotation. An adjusting means of the invention coacts with the rotary slide crank for adjusting the distance between the axis of rotation thereof and the parallel axis of rotation of the gear which carries the slide block, so that the non-uniformity of the drive of the pair of rotary crank drive means will be determined by the adjusted distance between this pair of axes. This adjusting means includes an adjustable bearing plate which supports the rotary slide crank for rotary movement and this bearing plate is shiftable perpendicularly to the axis of rotation of the slide crank. The structure which adjusts the bearing plate for the rotary slide crank provides a stepless adjustment thereof within predetermined limits. For this purpose the bearing plate is supported for shifting movement in a straight-line guiding structure and is fixed in its adjusted position by suitable screws. The pair of sealing or welding jaws are respectively supported by a pair of jaw carriers which are respectively fixed to slide blocks of the pair of rotary crank drive means. These slide blocks while being fixed to the pair of jaw carriers are freely rotatable with respect to rotary cranks of the pair of rotary crank drive means and are guided for movement in a vertical straight-line guiding structure. This latter structure is itself supported for movement by a second guide means in the form of suitable slide rolls and slide rails which extend transversely with respect to the straight line vertical guiding structure for the slide blocks of the pair of rotary crank drive means.

The pair of rotary crank drive means are themselves carried by a bearing plate which is shiftable in a housing of the machine, and through a suitable adjusting structure the elevation of the pair of rotary crank drive means can also be adjusted. This latter adjusting structure includes structure such as helical gears, a rotary threaded spindle driven thereby, and a nut through which the spindle is threaded, this nut being fixed to the bearing plate for the pair of rotary crank drive means.

A pair of identical structures of the above type are respectively situated at the opposed ends of the pair of jaw carriers and both of the structures are driven from a common drive shaft and are simultaneously capable of being adjusted in elevation in an identical manner.

With this construction of the invention it becomes possible to adjust the speed of movement of the welding or sealing jaws during actual sealing or welding in accordance with the speed of movement of the packing material. This adjustment of the movement of the sealing or welding jaws to a speed of movement which is the same as that of the movement of the packing material can be carried out within relatively wide limits in accordance with the desired length of the packages and does not require any separation of the drive for the welding or sealing jaws from those components which advance the packing material or from the main drive of the packing machine. In addition, there is no requirement of special control elements to regulate the movement of the welding or sealing jaws toward and away from each other in accordance with the cyclical operation of the machine.

BRIEF DESCRIPTION OF DRAWINGS

The invention is illustrated by way of example in the accompanying drawings which form part of this application and in which.

DESCRIPTION OF A PREFERRED EMBODIMENT

Figure 1:
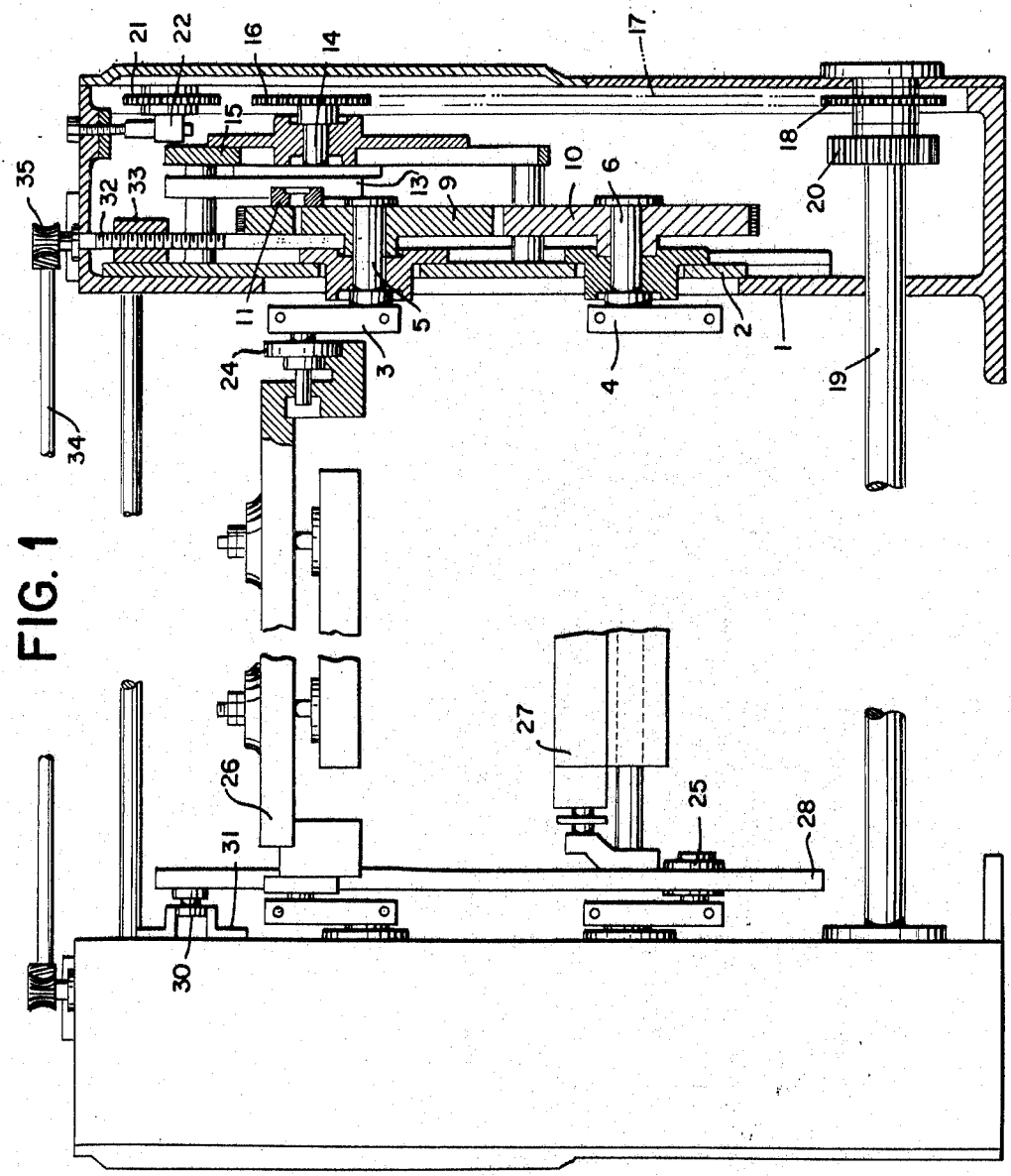
FIG. 1 is a schematic partly sectional side view of one possible embodiment of a structure of the invention.
Figure 3:
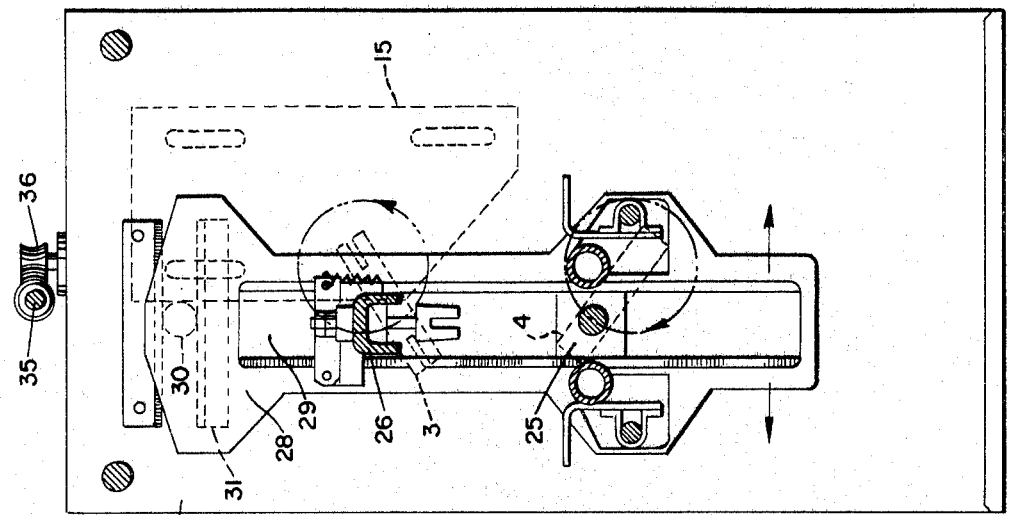
FIG. 3 is a fragmentary transverse elevation illustrating the structure for guiding the welding or sealing jaws.

Referring now to FIG. 1, there is illustrated therein a housing 1 in which a bearing plate 2 is mounted for vertical shifting movement. This bearing plate 2 carries a pair of rotary crank drive means which respectively include the pair of rotary cranks 3 and 4 which are respectively fixed to the pair of rotary shafts 5 and 6 which are parallel to each other and situated at a fixed distance from each other, these shafts being supported for rotary movement in bearings carried by the vertically adjustable plate 2.

The pair of rotary crank drive means are interconnected with each other by way of a pair of identical meshing gears 9 and 10 which are respectively fixed to the crank shafts 5 and 6 at the ends of the latter distant from the cranks 3 and 4. The upper gear 9 supports for rotary movement a slide block 11 which is turnable on a suitable pin fixed to the gear 9 at a predetermined distance from the axis thereof. Thus, the slide block 11 is eccentrically arranged on the rotary gear 9.

Figure 2:
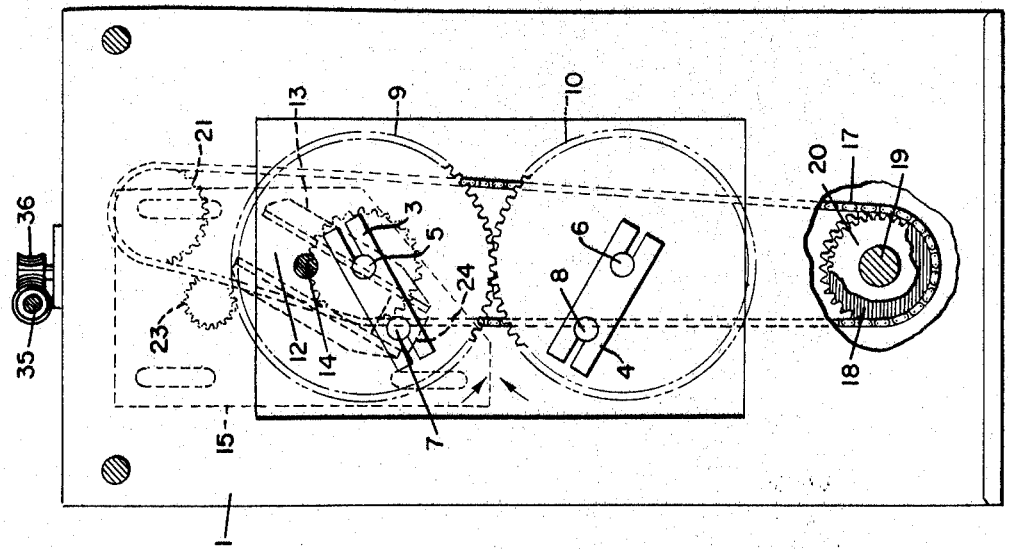
FIG. 2 is a fragmentary transverse elevation illustrating the drive for the pair of rotary crank drive means.

This slide block 11 is slidably received within a guiding groove 12 of a rotary slide crank 13. The slide crank 13 is fixed to a pin 14 whose axis coincides with the axis of rotating of the rotary slide 13, and it will be noted that the axis of the pin 14 is parallel to the axis of the shaft 5. This rotary pin or crank shaft 14 of the rotary slide crank 13 is supported for rotary movement in a bearing carried by a bearing plate 15 which is also vertically shiftable. For the purpose of adjusting the position of the bearing plate 15, a straight-line guiding structure is provided for the latter, and, as is schematically indicated in FIG. 2, this latter guiding structure includes elongated vertically extending slots which are formed in the bearing plate 15 while suitable which are threaded into tapped bores of stationary components of the machine can be loosened and tightened, these screws extending through the vertical slots of the plate 15 so that upon loosening of the screws, the elevation of plate 15 can be adjusted and upon tightening of the screws, the adjusted elevation of plate 15 will be maintained. In this way, it is possible to adjust the elevation of the axis of rotation of the rotary slide crank 13, and this axis of rotation will thus be adjusted at a predetermined distance from the axis of the shaft 5, the pair of axis of the shafts 5 and 14 being contained within the plane along which the axis of the shaft 14 is adjusted during vertical movement of the bearing plate 15. For the purpose of providing an accurate adjustment, it is possible to utilize a suitable adjusting scale.

The rotary slide crank 13 is driven by way of a rotating means which includes a sprocket wheel 16 fixed to the shaft 14 at its end which is distant from the rotary slide crank 13. The sprocket wheel 16 is driven by a sprocket chain 17 which is in turn driven by a sprocket wheel 18 fixed to a drive shaft 19. This drive shaft 19 is driven from the main drive of the machine by way of a gear 20 which is fixed to the shaft 19. In order to maintain a given tension in the chain 17, an additional sprocket wheel 21 is provided, this sprocket wheel 21 being supported for rotary movement in a bearing 22 whose elevation can be adjusted through a suitable threaded spindle, as indicated at the upper right portion of FIG. 1. An additional sprocket wheel 23 engages the endless drive chain 17 so as to maintain it in operative engagement with the sprocket wheel 16.

The pair of rotary crank drive means which include the cranks 3 and 4 and the shafts 5 and 6, also include crank pins 7 and 8 carried by the cranks 3 and 4, respectively, and extending in a freely rotatable manner into bores which are formed in a pair of slide blocks 24 and 25 so that the latter and the crank pins 7 and 8 are freely turnable with respect to each other. These slide blocks 24 and 25 are fixed with jaw carriers 26 and 27 and are supported for straight-line sliding movement in a vertical longitudinally extending guiding groove 29 formed in a longitudinal guide means 28. This guide means 28 is itself supported for movement by a second transverse guide means which takes the form of slide rollers 30 which are slidable and rotatable along guide rails 31, so that the guide means 30, 31 support the guide means 28 for horizontal movement back and forth while the guide means 28 itself guides the jaw carriers 26 and 27 for vertical movement.

In order to adjust the welding or sealing jaws with respect to the center of the packaged goods in dependence upon the different lengths of the packages, an adjusting means having a rotary threaded spindle 32 is provided. The vertically extending threaded spindle 32 is threaded through a spindle nut 33 of this adjusting means which is fixed to the bearing plate 2. Thus, when the spindle 33 is rotated, the elevation of the plate 2 will be adjusted, and it will be noted that in this way the axis of the shafts 5 and 6 are adjusted in the plane which contains this axis as well as the axis of the shaft 14. In order to adjust the elevation of the plate 2, the spindle 33 is driven through a pair of rotary helical gears 35 and 36 which may take the form of a worm and worm wheel, for example. The transmission element 35 is coaxially fixed to a rotary drive shaft 34 which is turned to adjust the elevation of the plate 2.

The above-described structure is located in the region of the right ends of the jaw cariers 26 and 27, as viewed in FIG. 1, and an identical construction is situated in the region of the left ends of these jaw carriers, the jaws themselves being supported on spring-pressed pins which are supported for axial movement of the jaw carriers so that as a result of this spring structure, it is possible for the sealing or welding jaws to remain in their closed sealing or welding positions during movement of the jaw carriers 26 and 27 along a predetermined fraction of their circular or cylindrical paths of movement. The pair of identical structures which are thus arranged at the opposite ends of the jaw carriers are operated synchronously and for this purpose are driven by way of the common drive shaft 19. In addition, the pair of guides 28 which are arranged in the region of the ends of the jaw carriers are rigidly interconnected with each other to suitable connecting members.

The above described structure operates in the following manner:

The drive shaft 19 is driven at a uniform speed of rotation from the main drive. By way of the chain 17 and sprocket wheel 18, the drive is transmitted to the sprocket wheel 16 so as to rotate the pin or shaft 14 and the rotary slide crank 13 at a uniform speed of rotation. By way of the adjustment of the distance between the axis of rotation of the rotary crank 13 with respect to the axis of rotation of the upper rotary drive crank 3, the uniform rotary movement of the rotary slide crank 13 is converted into a non-uniform rotary movement of the drive crank 3, and through the meshing identical gears 9 and 10, the rotary drive crank 4 is also driven equally and oppositely to the crank 3 in a non-uniform manner. Thus, the rotary movement of the rotary slide crank 13 is transmitted through the slide block 11 to the gear 9 which in turn drives the crank 3 through the crank shaft 5.

The jaw carriers 26 and 27 are thus driven by the pair of rotary crank drive means, which respectively include the drive cranks 3 and 4, along a pair of circular or cylindrical paths so that the jaw carriers are guided for movement toward and away from each other while remaining parallel to each other as a result of the sliding movement of the blocks 24 and 25 in the guide means 28. The assurance of the required period of time for bringing about the sealing or welding of the wall portions of the tubular enclosure to each other in the closed positions of the sealing or welding jaws is brought about by the above described springy mounting of the welding or sealing jaws on the jaw carriers 26 and 27.

The nature of the lack of uniformity in the rotary movement of the drive cranks 3 and 4 and thus in the operation of the jaw carriers 26 and 27 depends upon the distance between the axis of rotation of the rotary slide crank 13 and the axis of rotation of the drive crank 3. In order to be able to bring about a relationship in the speed of movement between the operating components and the speed of movement of the tubular enclosure which is longitudinally advanced, in dependence upon the required length of the individual packages, the axis of rotation of the rotary slide crank 13 is adjusted by vertical positioning of the bearing plate 15.

Assuming, for example, that the speed of movement of the package material is equal to the speed of movement of the sealing or welding jaws along their circular path of movement, then in this case the length of each package will approximately equal the length of the circular path of movement of the welding or sealing jaws. When the structure is adjusted to provide such packages whose length is approximately equal to the length of the path of movement of each sealing or welding jaw, the axis of rotation of the rotary slide crank 13 coincides with the axis of rotation of the crank 3, and cranks 3 and 4 now rotate uniformly.

Figure 4:
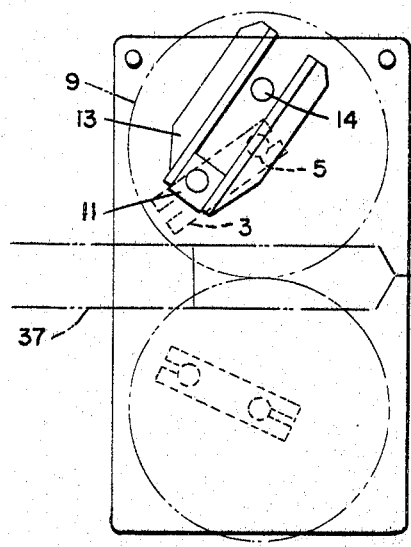
FIG. 4 is a schematic illustration of the device adjusted for producing packages of maximum length.
Figure 5:
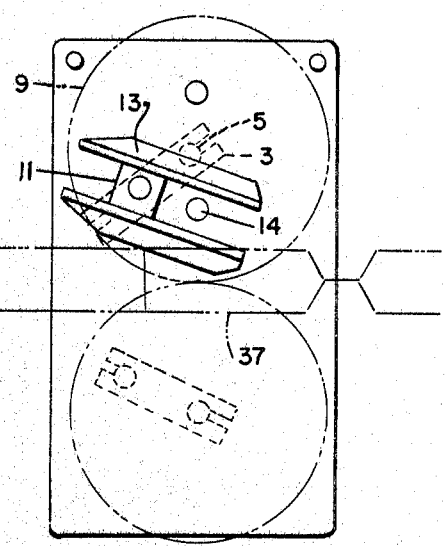
FIG. 5 is a schematic illustration of the device adjusted for producing packages of minimum length.

If the length of the packages is to be increased, then it is possible either to increase the speed of movement of the packaging material or to slow down the rotary speed of the welding or sealing jaws, or this result can be achieved by providing the best possible adaptation of both of these speeds with respect to each other. In order to compensate for the resulting speed differential when it is required to increase the length of the individual containers or packages, the shiftable plate 15 is adjustable with respect to the axis of the crank 3 so as to relocate the axis of rotation of the rotary slide crank 13 at a greater distance from the plane 37 (FIG. 4) along which the packing material is continuously advanced longitudinally, so that in this case, the axis of the rotary slide crank 13 is adjusted upwardly, as viewed in FIG. 4. The resulting lack of uniformity in the movement of the pair of drive cranks 3 and 4 and thus in the movement of the jaw carriers 26 and 27 provides the greatest speed of movement of the sealing jaws in their closed positions where the sealing or welding of the opposed wall portions of the tubular material enclosure is actually carried out. This maximum speed is adjusted to conform to the speed of movement of the packaging material in accordance with the selection of the distance of the axis of rotation of the slide crank 13 from the axis of the crank 3.

If it is desired instead to provide shorter lengths for the individual packages, then the adjustment is carried out in a reverse direction and the bearing plate 15 is instead lowered so that the axis of rotation of the rotary slide crank 13 approaches closer to the plane 37 along which the packing material is continuously advanced. For this adjustment, in order to take care of the situation where the length of each package is smaller than the circular path of movement of the sealing or welding jaws, the minimum speed of the non-uniformly moving welding or sealing jaws is adapted to the speed of movement of the packaging material.

What is claimed is:
1. In a packaging machine having a pair of jaws which are required to approach each other at given intervals for joining together opposed walls of a tubular enclosure during continuous axial advancement of the latter so as to provide between successive joined portions of the walls packages of predetermined length, a pair of rotary crank drive means operatively connected with the jaws for moving them toward and away from each other, a pair of identical meshing gears operatively connected to said pair of rotary crank drive means for respectively driving the latter equally and oppositely in response to rotary movement of one of said gears, a slide block fixed to said one gear at a given distance from the axis thereof for rotary movement about said axis, a rotary slide crank having an axis of rotation parallel to that of said one gear and slidably engaging said slide block for rotating the latter and thus transmitting a drive to said one gear, rotating means operatively connected to said rotary slide crank for rotating the latter at a predetermined uniform speed of rotation, and adjusting means coacting with said rotary slide crank for adjusting the distance between the axis of the latter and the axis of said one gear so as to derive from the uniform rotary movement of said slide crank a non-uniform rotary movement of said pair of rotary crank drive means, the nature of the non-uniform rotary movement being determined by the adjustment of said axes with respect to each other.

2. The combination of claim 1 and wherein said adjusting means coacts with said rotary slide crank for adjusting the latter in a plane which contains both of said axes.

3. The combination of claim 2 wherein said adjusting means provides one adjustment where both of said axes coincide and said pair of rotary crank drive means have a uniform rotary movement.

4. The combination of claim 3 and wherein said adjusting means coacts with said rotary slide crank for adjusting said axes thereof in both directions from said one adjustment where said axes coincide.

5. The combination of claim 1 and wherein said rotating means includes a sprocket wheel connected with said rotary slide crank and having an axis coinciding with the axis of rotation thereof, and a sprocket chain engaging said sprocket wheel for rotating the latter, said adjusting means including a bearing plate supporting said rotary slide crank for rotary movement and means for shiftably supporting said bearing plate to provide through adjustment of said slide crank an adjustment of the distance between said axes.

6. The combination of claim 1 and wherein a pair of jaw carriers respectively carry the jaws which are to be moved toward and away from each other, said pair of rotary crank drive means having a pair of slide blocks respectively fixed to said jaw carriers, and longitudinal guide means slidably coacting with said latter blocks for guiding the latter for movement toward and away from each other along a common straight line.

7. The combination of claim 6 and wherein a transverse guide means coacts with said longitudinal guide means to support and guide the latter for movement transversely of said straight line.

8. The combination of claim 1 and wherein a bearing plate carries said pair of rotary crank drive means, said pair of identical meshing gears as well as said adjusting means, a housing supporting said bearing plate for adjustable movement along a path which displaces said axis of said both gears in a plane which contains both of said axes, and adjusting means operatively connected to said bearing plate for adjusting the position thereof so as to adjust the elevation of said pair of rotary crank drive means in order to adjust the said pair of jaws with respect to the center of the said tubular enclosure.

9. The combination of claim 8 and wherein said adjusting means includes a nut fixed to said plate, a spindle threaded through said nut, and a transmission operatively connected to said spindle for rotating the latter about its axis so as to shift said plate along said spindle.

10. The combination of claim 9 and wherein said pair of rotary crank drive means and all of the structure coacting therewith is situated in the region of one end of said jaws, and said pair of rotary crank drive means and all of the structure operatively connected thereto being duplicated at the other end of said jaws, and a common drive shaft extending between and connected to both of said rotating means for driving the latter from said common drive shaft.

References Cited

UNITED STATES PATENTS

| | | | |
|---|---|---|---|
| 2,793,481 | 5/1957 | Rado | 53—285 |
| 3,358,419 | 12/1967 | Bjork et al. | 53—180 |

TRAVIS S. McGEHEE, Primary Examiner

U.S. Cl. X.R.

53—180